United States Patent
Ebbo et al.

(10) Patent No.: US 7,120,897 B2
(45) Date of Patent: *Oct. 10, 2006

(54) USER CONTROL OBJECTS FOR PROVIDING SERVER-SIDE CODE GENERATION FROM A USER-DEFINED DYNAMIC WEB PAGE CONTENT FILE

(75) Inventors: David S. Ebbo, Redmond, WA (US); Scott D. Guthrie, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 828 days.

This patent is subject to a terminal disclaimer.

(21) Appl. No.: 09/902,469

(22) Filed: Jul. 10, 2001

(65) Prior Publication Data

US 2003/0025728 A1  Feb. 6, 2003

(51) Int. Cl.
*G06F 9/44* (2006.01)
*G06F 9/45* (2006.01)

(52) U.S. Cl. .................................. 717/108; 717/148
(58) Field of Classification Search ............... 717/100, 717/106–108, 148
See application file for complete search history.

(56) References Cited

U.S. PATENT DOCUMENTS

| | | |
|---|---|---|
| 5,517,655 A | 5/1996 | Collins et al. |
| 5,748,890 A | 5/1998 | Goldberg et al. |
| 5,774,670 A | 6/1998 | Montulli |
| 5,812,996 A | 9/1998 | Rubin et al. |
| 5,835,712 A * | 11/1998 | DuFresne .................. 709/203 |
| 5,835,724 A | 11/1998 | Smith |
| 5,897,622 A | 4/1999 | Blinn et al. |
| 5,940,075 A | 8/1999 | Mutschler, III et al. |
| 5,953,524 A | 9/1999 | Meng et al. |
| 5,961,601 A | 10/1999 | Iyengar |
| 5,983,227 A | 11/1999 | Nazem et al. |
| 5,991,802 A | 11/1999 | Allard et al. |
| 6,014,666 A | 1/2000 | Helland et al. |
| 6,032,207 A | 2/2000 | Wilson |
| 6,076,108 A | 6/2000 | Courts et al. |
| 6,108,717 A | 8/2000 | Kimura et al. |
| 6,115,744 A | 9/2000 | Robins |
| 6,178,461 B1 | 1/2001 | Chan |
| 6,185,608 B1 | 2/2001 | Hon et al. |

(Continued)

FOREIGN PATENT DOCUMENTS

EP 01111679 A2 12/2000

(Continued)

OTHER PUBLICATIONS

Davuleu, Hasan, Freire, Juliana, Kifer, Michael, Ramakrishnan, I.V., "A Layered Architecture for Querying Dynamic Web Content", p. 491-502, ACM 1999, retrieved from ACM Portal database Dec. 4, 2003.*

(Continued)

*Primary Examiner*—Wei Zhen
*Assistant Examiner*—Mary J. Steelman
(74) *Attorney, Agent, or Firm*—Microsoft Corporation

(57) ABSTRACT

A method and apparatus to create an intermediate language or source code file from a server-side resource or dynamic web page file using a hierarchically specified set of user controls. The source code can then be compiled into an executable class allowing for rapid generation of web page control objects that perform server-side functions, including the rendering of client responses. The code generation scheme of the present invention is capable of creating control objects connected in a hierarchy to handle event processing and the setting of attributes to the specific objects.

19 Claims, 8 Drawing Sheets

U.S. PATENT DOCUMENTS

| | | | |
|---|---|---|---|
| 6,205,480 B1 | 3/2001 | Broadhurst et al. | |
| 6,212,192 B1 | 4/2001 | Mirashrafi et al. | |
| 6,230,160 B1 | 5/2001 | Chan | |
| 6,247,044 B1 | 6/2001 | Gosling et al. | |
| 6,253,228 B1 | 6/2001 | Ferris et al. | |
| 6,351,767 B1 | 2/2002 | Batchelder et al. | |
| 6,370,561 B1 | 4/2002 | Allard et al. | |
| 6,373,841 B1 | 4/2002 | Goh et al. | |
| 6,397,253 B1 | 5/2002 | Quinlan et al. | |
| 6,405,241 B1 | 6/2002 | Gosling | |
| 6,460,071 B1 | 10/2002 | Hoffman | |
| 6,460,141 B1 | 10/2002 | Olden | |
| 6,480,894 B1 | 11/2002 | Courts et al. | |
| 6,487,665 B1 | 11/2002 | Andrews et al. | |
| 6,557,038 B1 | 4/2003 | Becker et al. | |
| 6,591,272 B1* | 7/2003 | Williams | 707/102 |
| 6,622,168 B1 | 9/2003 | Datta | |
| 2001/0054020 A1 | 12/2001 | Barth et al. | |
| 2002/0008703 A1 | 1/2002 | Merrill et al. | |
| 2003/0009476 A1* | 1/2003 | Fomenko et al. | 707/103 R |
| 2003/0009519 A1 | 1/2003 | Gosling et al. | |
| 2003/0009567 A1 | 1/2003 | Farouk | |
| 2003/0018827 A1 | 1/2003 | Gutherie et al. | |
| 2003/0028565 A1 | 2/2003 | Landsman et al. | |
| 2003/0074634 A1* | 4/2003 | Emmelmann | 715/513 |

FOREIGN PATENT DOCUMENTS

| | | |
|---|---|---|
| EP | 01111678.7-2201 | 4/2002 |
| EP | 01111680.3-2201 | 4/2002 |
| EP | 01111681.1-2201 | 4/2002 |
| EP | 01111682.9-2201 | 4/2002 |
| WO | WO 98/21651 | 5/1998 |
| WO | WO 98/44695 | 10/1998 |
| WO | WO 99/34288 | 7/1999 |

OTHER PUBLICATIONS

Payarali, Irfan, O'Ryan, Carlos, Schmidt, Douglas, Wang, Nanbor, Gokhale, niruddha S., Kachroo, Vishal, "Using Principle Patterns to Optimize Real-Time ORBs", p. 16-25, 2000 IEEE, retrieved from IEEE database Dec. 4, 2003.*
Shi, W., Collins, E., Karamcheti, V., "Modeling Object Characteristics of Dynamic Web Content", p. 1-31, Jul. 2000, Wayne State Univ & Department of CS, New York Univ., retrieved from google.com search Dec. 4, 2003.*
Wu, Dapeng; Hou, Yiwci Thomas; Zhang, Ya-Qin; "Scalable Video Transport over Wireless IP Networks"; IEEE 2000; pp. 1185-1191.
Dobson, Rick; "Data Binding in Dynamic HTML"; DBMS Mar. 1998 pp. 47-52.
Penn, Gerald; Hu, Jianying; Luo, Hengbin; McDonald, Ryan; "Flexible Web Document Analysis for Delivery to Narrow-Bandwidth Devices"; IEEE 2001; pp. 1074-1078.
Esposito, Dino; "Heaven Sent"; Developer Network Journal issue Mar. /Apr. 23, 2001 pp. 18-24.
Hovanes, Michael E.; Deal, John R. Grizz; Rowberg, Alan H.; "Seamless Multiresolution Display of Portable Wavelet-Compressed Images" Journal of Digital Imaging, vol. 12, No. 2, suppl 1 (May) 1999, pp. 109-111.
Ingham; David B; "W3Objects: A Distributed Object-Oriented Web Server" Object-Oriented Web Servers and data Modeling Workshop, Sixth International World Wide Web Conference, Apr. 7, 1997, Santa Clara, CA 4 pages.
Kunz, T.; El Shentenawy, M.; Gaddah, A.; Hafez, R.; Image Transcoding for Wireless WWW Access: The User Perspective; Multimedia Computing and Netorking 2002, Proceedings of SPIE vol. 467 (2002) pp. 28-33.
"OOP Launches Hammock at JavaOne" http://www.oop.com/pr2000_06_08.jsp?gui=Plain Jun. 8, 2000, 1 page.
"Hammock: Think of it as Swing for the Web"; Jul. 14, 2000; 10 pages.
Hammond, Eric "Hammock Swings through Web interfaces" www.infoworld.com/articles/mt/xml/00/07/17/000717mthammock.xml; Jul. 14, 2000; 3 pages.
Duan, Nick N.; "Distributed Database Access in a Corporate Environment Using Java" Bell Atlantic Corporation; 1996; 8 pages.
Nadamoto, Akiyo; Kondo, Hiroyuki; Tanaka, Katsumi; "WebCarousel: Restructuring Web Search Results for Passive Viewing in Mobile Environments" IEEE 2001 p. 164-165.
Developing ASP-Based Applications: Microsoft 1996, 5 pages.
"ColdFusion: Web Application Server"; Allair Corp; www.allair.com; 1995-1999.
"Alterego Networks Introduces First Mobile Web Server for Enterprises, Telcos and Providers"; Redwood City, CA; Nov. 14, 2000; 3 pages.
"Bluestone Software Layes Foundation for Internet Operating Environment with Total-E-Server . . . " Screaming Media, Business Wire; Jun. 5, 2000; 3 pages.
Stewart, Tony; "The Document as Application: Issues and Implications" GCA XML Europe 1999; pp. 575-599.
Franklin, Keith; "Supercharge Data Binding"; Visual Basic Programmer's Journal, Mar. 2000; 7 pages.
Shapiro, Marc; "A Binding Protocol for Distributed Shared Objects" Presented at 14th International Conference on Distributed Comp. Sys.; Jun. 21-24, 1994; 17 pages.
"Best Practices for Creating Adaptive User Interfaces with the Mobile Internet Toolkit"; Microsoft Corporation, Jan. 2002; 15 pages.
"Best Practices for the Microsoft Mobile Internet Toolkit Image Control"; Microsoft Corporation, Feb. 2002.
Marshall, James; "HTTP Made Really Easy: A Practical Guide to Writing Clients and Servers"; Aug. 15, 1997; 14 pages.
Chapter 3, "Mechanics of Developing JavaScript Applications"; Server-Side Javascript Guide; Online! 1999; pp. 51-108 www.developer.netscape.com/docs/manuals/ssjs/1_4/ssjs.pdf.
Chapter 6, "Session Mangement Service"; Server Side Javascript Guide; Online! 1999 pp. 125-166 www.developer.netscape.com/docs/manuals/ssjs/1_4/ssjs.pdf.
"A Brief History of Hypertext" Microsoft Corporation, 1996, 1 page.
"HTML Encyclopaedia"; http://www.scit.wlv.ac.uk/encyc/form.html; 2 pages.
Title: A Preview of Active Server pages+.
Authors: Richard Anderson, Alex Homer, Rob Howard, Dave Sussman Copyright: 2000 Wrox Press pp. 1-73.
European Search Report 01 11 1878.7-2201.
European Search Report 01 1 1 1680.3-2201.
European Search Report 01 1 1 1681.1-2201.
European Search Report 01 1 1 1682.9-2201.
Custer, Helen; "Inside Windows NT"; Microsoft Press 1993; pp. 74-81.
Frost, Jim; "Windows NT Security"; May 4, 1995; 7 pages; http://world.std.com/-jimf/papers/nt-security/nt-security.htmi.
Holmes, John W; e-Mail response to question regarding GET/POST.HTTP request, extracted from GOOGLE's News groups, php.general, Nov. 11, 2002.
"HTML Encyclopaedia"; hftp://www.scit.wlv.ac.uk/encyc/form.html; 1995-1998 2 pages.
Kitayama, Fumihiko; Hirose, Shin-Ichi; Kondoh, Goh; Kuse, Kazushi; "Design of a Framework for Dynamic Content Adaptation to Web-Enabled Terminals and Enterprise Applications"; IEEE 1999, pp. 72-79.
Solomon, David A. "Inside Windows NT. Second Edition"; Microsoft Press 1998; pp. 310-319.
Wli, Dapeng; Holi, Yiwci Thomas; Zhang, Ya-Qin; "Scalable Video Transport over Wireless IP Networks"; IEEE 2000; pp. 1165-1191.

* cited by examiner

500

Testpage.aspx
```
1    <%@ Page Description="A Sample Page Consuming a User Control" %>
2    <%@ Register TagPrefix="merchant" TagName="datagrid" Src="MySimpleControl.aspc" %>
3    <html>
4        <script language="VB" runat=server>
5            sub Page_load(Sender as Object, E as EventArgs)
6                MySimpleControl.CustomerState = "CA"
7            End Sub
8        </script>

9        <body>
10           <h1> Merchant Page Title</h1>
11               <merchant:datagrid id="MySimpleControl" runat=server/>
12
13       </body>
14   </html>
```

510

MySimpleControl.aspc
```
1    <html>
2        <script language="VB" runat=server>
3            Public CustomerState = string
4            sub Page_Load(Sender as Object, E as EventArgs)
5                MyList.Data = SQL_Call("Select * from Authors = " & CustomerState)
6            end Sub
7        </script>

8        <body>
9            <h1> Merchant Page Title</h1>
10           <asp:datagrid id="MyList" runat=server/>
11       </body>
12   </html>
```

FIG. 5

USER CONTROL OBJECTS FOR PROVIDING SERVER-SIDE CODE GENERATION FROM A USER-DEFINED DYNAMIC WEB PAGE CONTENT FILE

CROSS-REFERENCE TO RELATED APPLICATIONS

This patent application is related to co-owned U.S. patent application Ser. No. 09/573,768, entitled "Server-side Code Generation From a Dynamic Web Page Content File".

TECHNICAL FIELD

The invention relates generally to a web server framework, and more particularly to server-side code generation to create hierarchically specified user defined control objects that process client-side user interface elements of a web page.

BACKGROUND

A typical web browser receives data from a web server defining the appearance and rudimentary behavior of a web page for display on a client system. In a typical scenario, a user specifies a Uniform Resource Locator ("URL"), a global address of a resource on the World Wide Web, an intranet, and other computer networks to access a desired web site. An example URL is "http://www.microsoft.com/ms.htm". The first part of the example URL indicates a given protocol (i.e., "http") to be used in the communication. The second part specifies the domain name (i.e., "www.microsoft.com") where the resource is located. The third part specifies the resource (i.e., a file called "ms.htm") within the domain. Accordingly, a browser generates an HTTP (Hypertext Transport Protocol) request associated with the example URL to retrieve the data associated with ms.htm file within the www.microsoft.com domain. A web server hosting the www.microsoft.com site receives the HTTP request and returns the requested web page or resource in an HTTP response to the client system for display in the browser.

The "ms.htm" file of the example above corresponds to a web page file that includes static HTML (Hypertext Markup Language) code. HTML is a plain-text authoring language used to create documents (e.g., web pages) on the World Wide Web. As such, an HTML file can be retrieved from a web server by a client browser which converts the HTML code to actual visual images or audio components and is thus displayed as a web page. On the client computer systems, this process displays the web page content defined by the delivered HTML file. Using HTML, a developer can, for example, specify formatted text, lists, forms, tables, hypertext links, inline images and sounds, and background graphics for display in the browser. An HTML file, however, is a static file that does not inherently support dynamic generation of web page content. Web page content is the HTML code that is returned to the client for display. Dynamic operation of such relates to a server side application that, as a result of processing steps, generates the HTML code prior to sending as opposed to just sending predetermined code to client browser.

In order to handle more complex client-server interaction, server-side application programs have developed to handle more complex client-server interaction, such as the providing of dynamic content, e.g., changing stock prices or traffic information. The server-side application program processes the HTTP request and dynamically generates the appropriate HTML code for transmission to the client in an HTTP response. For example, a server-side application program can process query strings and data from Web-based forms provided by the client in HTTP requests to dynamically generate HTML code for transmission in an HTTP response to the client. In essence, the server side application can generate an HTML-type file that is customized based on information in a request from a client. In such a case, there is no static HTML file that is stored on the server; the HTML file is dynamically created at runtime. An exemplary server-side application program may generate HTML code using a sequence of one or more formatted text write operations to a memory structure. Thereafter, the resulting text is transmitted to a client system in an HTTP response, where it is displayed in the browser.

Developing a server-side application program can be a complex task requiring not only familiarity with normal HTML coding that is used to layout a Web page, but also with programming basics, including one or more programming languages (e.g., C++, Perl, Visual Basic, or Jscript). Unfortunately however, many Web page designers are frequently graphics designers and editors, who provide the human touch but often lack programming experience. Thus, there is a need to provide a simplified web page development framework to create web page files that allows those with less programming experience to develop web page interfaces between server side applications and their respective clients. It is desirable, therefore, to provide a development framework to allow a developer to dynamically create and process a web page with minimal programming.

One approach to minimize the programming requirements of dynamic web page generation has been the Active Server Page (ASP) framework, provided by Microsoft Corporation. The ASP framework allows developers to create "ASP" web page files that typically include Visual Basic or Jscript code, as well as other HTML code. The ASP file contains declarations or tags that perform various functions as well as VB script or Jscript code. These declarations are generally easier to write than writing actual programming code.

During operation, the HTTP request specifies the ASP file as the desired resource and, thereafter, the ASP file is used to generate the resulting HTML code in the HTTP response to the client. Furthermore, an ASP file may reference pre-developed or third party server-side library components (e.g., server-side ACTIVEX controls) as well as data bases or other third party applications to ease a given application programming efforts.

The ASP web page file must be converted at runtime to a script that can be interpreted by a script engine. The script engine typically performs the various declaration-type commands in the ASP file in a consecutive or synchronous manner to achieve the desired result. Compared to files that are compiled and stored as executable files, script files run by script engines are generally slower since the script engine must perform an interpretation function rather than simply running the file.

One particular problem with compiling a script file into an executable file is that there is or maybe a combination of various languages in the script file. For example, the script file may include components written in HTML and others written in Visual Basic. The script engine uses various operations to interpret these elements at runtime, but no compilers exist to translate the different language components to a single language, i.e., a single source code file. Moreover, in the current server-side application frameworks, the programming required to dynamically manage client-side user interface elements (e.g., text boxes, list boxes, buttons, hypertext links, images, sounds, etc.) within server-side applications can still require sophisticated programming skills. As these server-side processes become more complex, script engines will not be able to continuously keep up with the demands.

At the same time, programming models that allow reusable elements to be created and specified using easy-to-understand script-based programming language permit a larger universe of potential programmers to create programming objects. As a result, script-language based programming model text addresses the complexity and performance needs of service side programs are highly desirable. For these and other reasons the present invention has been made.

SUMMARY

The present invention relates to a code generation method and apparatus to create an intermediate language or source code file from a server-side resource, the source code file then being compiled into an executable class. The executable class allows for rapid generation of web page control objects that perform server-side functions, including the rendering of client responses. In an embodiment of the present invention, the code generation scheme is capable of creating control objects connected in a hierarchy to handle event processing and the setting of attributes to the specific objects. Furthermore, the code generation method is also capable of connecting objects that have been declared using a template.

In accordance with preferred aspects, the present invention relates to a method of creating a class in a server computer system memory. The class is used by the server computer system to create server-side objects for dynamically rendering web page content and the web page content is delivered to a client-side computer system and displayed as a web page on the client computer system. In operation, the server computer system receives a request from the client computer system for the web page and wherein the request identifies a dynamic web page content file. The server computer creates a data model to store elements of the dynamic web page content file, evaluates the data model and generates a source code file related to the dynamic web page content file based on the evaluation of the data model. Once the source code file is created, the source code file is compiled to create a compiled class in memory. The process generally ends with the return of a class reference to the server computer system which enables the server computer system to use the class.

In accordance with other preferred embodiments, the method stores the class in cache memory on the server computer system. Once stored in cache memory, multiple server side page objects can be instantiated from the singular compiled class and the original resource is not used again. Each time a request for the web page is received, the server computer system determines whether a compiled class for that dynamic web page content file resides in memory. If the requested class does not exist in memory, it is created. Once the class is located, the server computer system instantiates server-side processing objects from that class to dynamically generate web page content. The web page content is then rendered and conducted to the client computer system.

In accordance with yet other embodiments of the present invention, the method step of evaluating the data model involves the recursive traversal of the data model during a plurality of passes. During the first pass, source code is generated and written to the source code file based on the evaluation of the data model during that pass. The data model is constructed using data structures that are linked in a hierarchical manner.

An embodiment of a computer program product in accordance with the present invention includes a computer program storage medium readable by a computer system and encoding a computer program for executing a computer process of creating a compiled class in memory on the server computer. The compiled class is used to instantiate server-side processing object to render a response corresponding to a requested web page to be displayed on a client computer system. An alternative embodiment of a computer program product in accordance with the present invention includes a computer data signal embodied in a carrier wave by a computing system and encoding a computer program for creating the compiled class on the server.

BRIEF DESCRIPTION OF THE DRAWINGS

FIG. 5 illustrates contents of two exemplary hierarchical dynamic content file for a user specified hub control object in an embodiment of the present invention.

DETAILED DESCRIPTION

An embodiment of the present invention relates to a method of creating a compiled class in memory for a particular web page defined by a dynamic web page content resource or file. Creating the compiled class involves creating a source code file from the web page file. The source code file is then compiled into the class. Once a compiled class exists in memory, a page object can be instantiated to render the response which is sent back to a client for display. The page object generally involves server-side control objects for processing and generating client-side user interface elements which are displayed on the web page. Furthermore, a hierarchy of server-side control objects can be declared in the web page file wherein these objects ultimately cooperate to generate the resulting authoring language code, such as HTML, for display of the web page on the client. The server side controls may consist of pre-built, system provided controls, third-party provided, compiled controls, and user controls created and used according to the present invention.

Figure 1A:
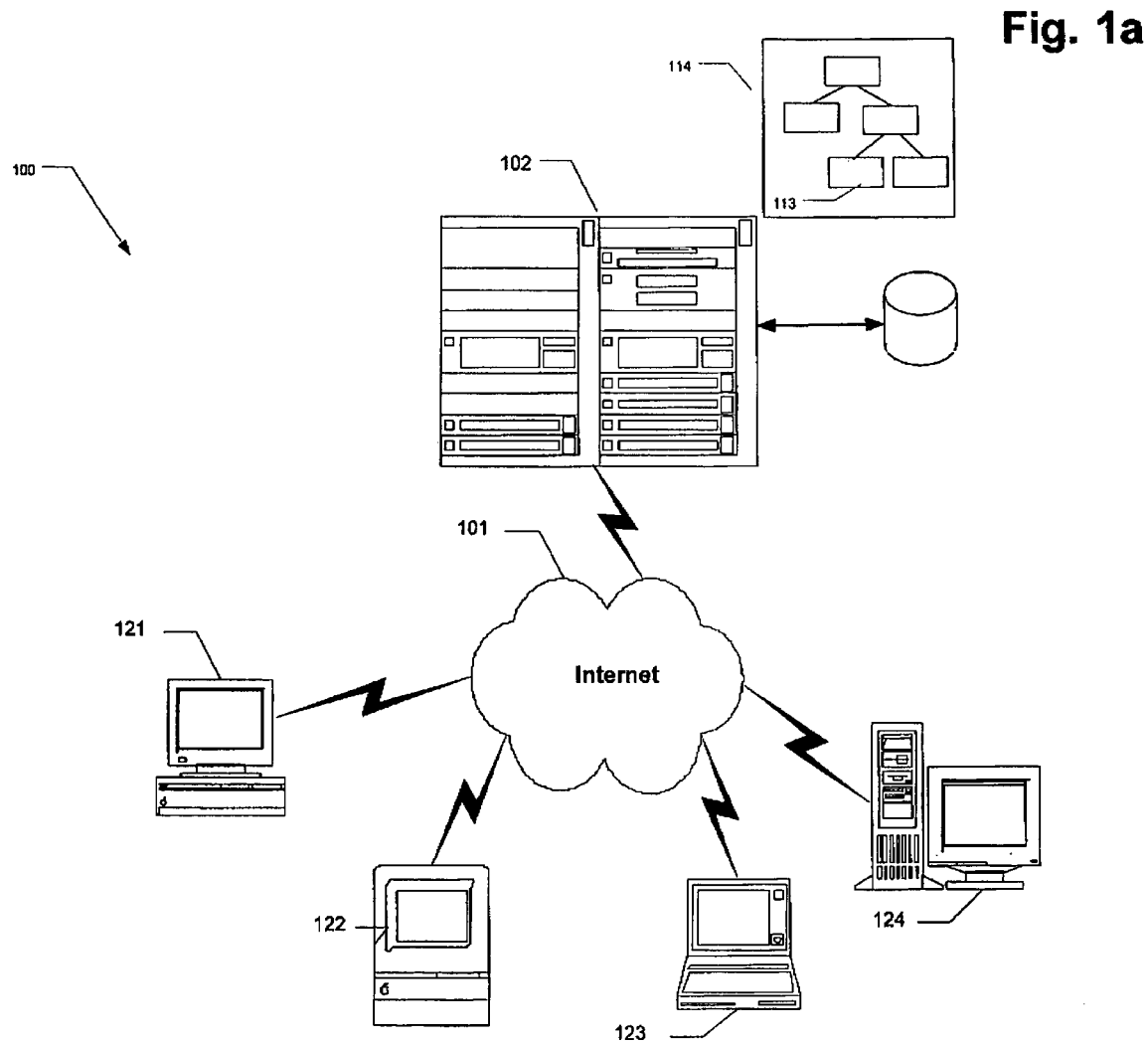
FIG. 1a illustrates a web server for dynamically generating web page content for display on a client in an embodiment of the present invention.

FIG. 1 illustrates a network based processing system providing data processing services to remote clients according to one embodiment of the present invention. Remote users use client processors 121–124 to communicate over a communications network like the Internet 101 to communicate to one or more server processors 102 to obtain data and processing services. Web servers typically have provided a mechanism to permit content data to be displayed within a web browser running on a remote client. Over time, this content data has evolved to include static pages, dynamically created pages, and pages that include programmable functionality that executes within the framework of the browser. This data exchange model in which a user interface is projected across the web using a web browser to transfers a "page" of data to be displayed to the user.

Remote server 102 dynamically creates the web page returned to a client 122 using a specification for the page 114 that contains a hierarchy of controls. Each control 113 renders a portion of the HTML for the web page returned to a client 122. These controls may be nested any number of recursive levels as may be needed to specify the page dynamically.

Figure 1B:
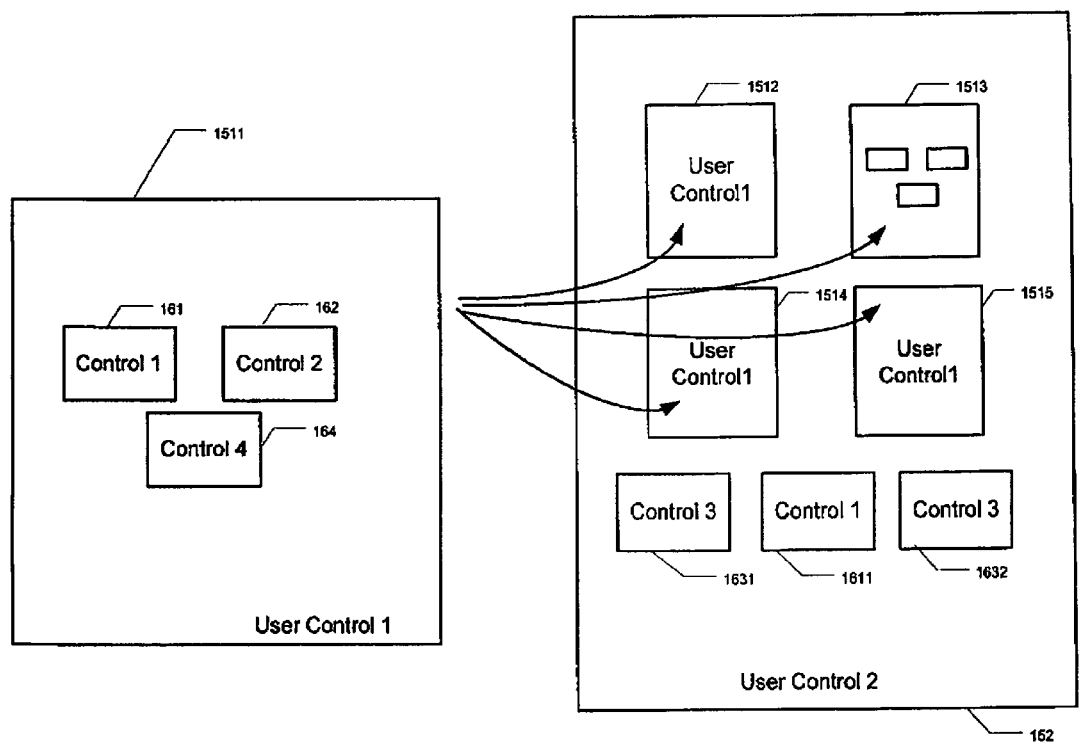
FIG. 1b illustrates a web page using a hierarchy of users controls for dynamically generating web page content for display on a client in an embodiment of the present invention.

FIG. 1*b* illustrates a web page using a hierarchy of users controls for dynamically generating web page content for display on a client in an embodiment of the present invention. A User Control 1 1511 is a server side control object that is specified using an ASP+page. The User Control 1 1511 is constructed using three instances of three different system-provided control objects, Control 1 161, Control 2 162, and Control 4 164. These system-provided controls refer to previously compiled data processing objects that generate the HTML for the object specified therein.

User Control 1 1511 itself may be used within a second User Control, User Control 2 152. In the particular embodiment, four separate instances of User Control 1 1512–1515 are included within the definition of User Control 2 152. Each of these separate instances of User Control 1 1512–1515 generate a separate set of HTML for the web page returned to a client 122. Each of these instances also are constructed using their own respective sets of Control 1 161, Control 2 162, and Control 4 164 when instances of these user controls generate their respective HTML code.

In addition, User Control 2 152 also uses two additional instances of a system control, Control 3 1631–1632, and another instance of Control 1 1611. Each control in the specification generates its corresponding HTML code, which when viewed together, specifies the entire web page generated and returned to a client 122.

Figure 2:
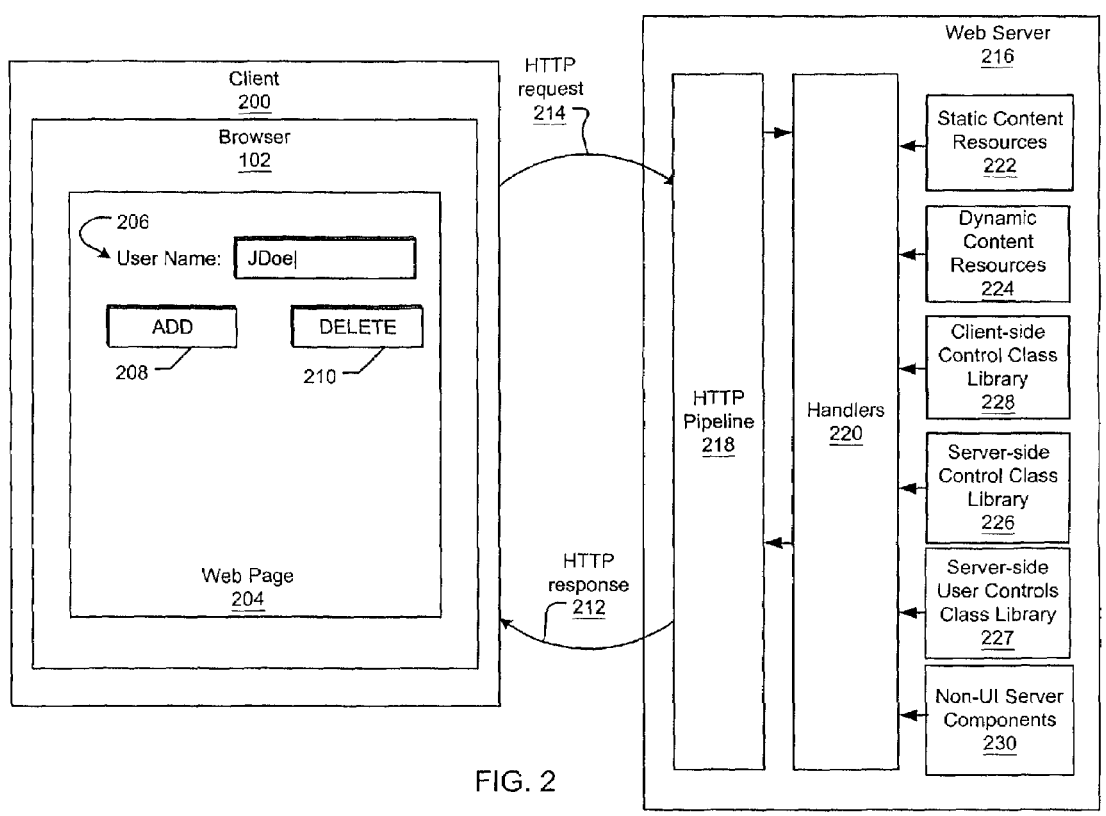
FIG. 2 illustrates a web server for dynamically generating web page content for display on a client in an embodiment of the present invention.

FIG. 2 illustrates a web server for dynamically generating web page content for display on a client in an embodiment of the present invention. A client 200 executes a browser 102 that displays a web page 204 on a display device of the client 200. The client 200 includes a client computer system having a display device, such as a video monitor (not shown). An "INTERNET EXPLORER" browser, marketed by Microsoft Corporation, is an example of a browser 102 in an embodiment of the present invention. Other exemplary browsers include without limitation "NETSCAPE NAVIGATOR" and "MOSAIC". The exemplary web page 204 includes a text box control 206 and two button controls 208 and 210. The browser 202 receives HTML code in the HTTP response 212 from a web server 216 and displays the web page as described by the HTML code. Although HTML is described with reference to one embodiment, other authoring languages, including without limitation SGML (Standard Generalized Markup Language) and XML (eXtensible Markup Language), are contemplated within the scope of the present invention.

The communications between the client 200 and the web server 216 are conducted using a sequence of HTTP requests 214 and HTTP responses 212. Although HTTP is described with reference to one embodiment, other transport protocols, including without limitation HTTPS and S-HTTP, are contemplated within the scope of the present invention. On the web server 216, an HTTP pipeline module 218 receives HTTP request 214, resolves the URL, and invokes an appropriate handler 220 for processing the request. In an embodiment of the present invention, a plurality of handlers 220 to handle different types of resources are provided on the web server 216.

For example, if the URL specifies a static content file 222, such as an HTML file, a handler 220 accesses the static content file 222 and passes the static content file 222 back through the HTTP pipeline 218 for communication to the client 200 in an HTTP response 212. Alternatively, in an embodiment of the present invention, if the URL specifies a dynamic content resource or file 224, such as an "ASP.NET" (Active Server Page+) page, a handler 220 accesses the dynamic content file 224, processes the contents of the dynamic content file 224, and generates the resulting HTML code for the web page 204. Generally, a dynamic content resource, such as file 224, is a server-side declaration datastore that can be used to dynamically generate the authoring language code that describes a web page to be displayed on a client. The HTML code for the web page is then passed through the HTTP pipeline 218 for communication to the client 200 in an HTTP response 212.

During its processing, a handler 220 can also access libraries of pre-developed or third-party code to simplify the development effort. One such library is a server-side class control library 226, from which the handler 220 can instantiate server-side control objects for processing user interface elements and generating the resultant HTML data for display of a web page. Another such library is a client-side control class library 228. For a more complete description of the operation and use of these pre-developed and compiled libraries of server-side control objects, see commonly assigned U.S. patent application, Ser. No. 09/573,768, entitled Server-Side Code Generation from a Dynamic Web Page Content File, filed May 18, 2000, which is incorporated in its entirety by reference.

The handler 220 also may access a library of user defined controls 227. These user controls consist of controls specified using a hierarchical page structure as discussed in reference to FIG. 1*b*. Once a user control is created and saved into the user control object library 227, the web server 216 may use the control in any other control on the web server 216 that properly references the user control. The web server 216 processes these user controls in the same manner that the server 216 processes all other controls regardless of their type. These user control objects are specified within an .ASCX file containing a human-readable definition of the user controls. An example of one such .ASCX file is found within FIG. 5. These user control objects are compiled, when initially accessed following their creation and modification, into executable server-side control objects that may themselves be referenced identically to any other server-side control object used to render an HTML page specification.

A handler 220 also has access to one or more non-user-interface server components 230 that execute on the web server 216 or on another accessible web server. A non-user-interface server component 230, such as a stock price look-up application or database component, may be referenced in or associated with a dynamic content file 224 that is processed by a handler 220. The non-user-interface server component 230 may process events raised by the server-side control objects declared in the dynamic content file 224. As a result, the processing provided by the server-side control objects simplifies the programming of the non-user-interface server component 230 by encapsulating the processing and generation of the user interface elements of a web page, which allows the developer of the non-user-interface server component 130 to concentrate on the specific functionality of the application, rather than on user interface issues.

Figure 3:
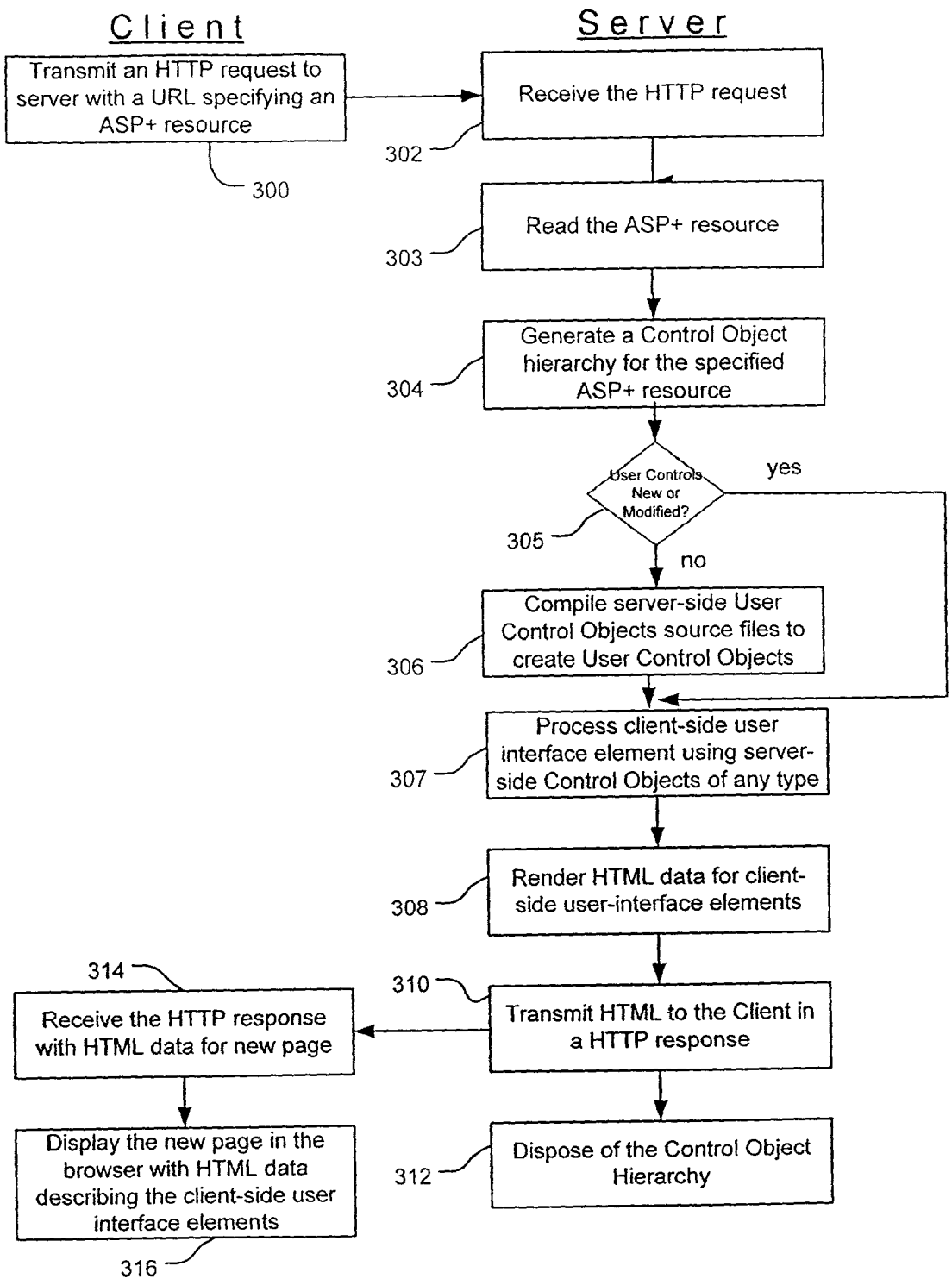
FIG. 3 illustrates a flow diagram of operations for processing and rendering client-side user interface elements using server-side control objects in an embodiment of the present invention.

FIG. 3 illustrates a flow diagram of operations for processing and generating client-side user interface elements using server-side control objects in an embodiment of the present invention. In operation 300, the client transmits an HTTP request to the server. The HTTP request includes a URL that specifies a resource, such as an ASP.NET page. In operation 302, the server receives the HTTP request and invokes the appropriate handler for processing the specified resource. The ASP.NET page is read in operation 303. Operation 304 generates a server-side control object hierarchy based on the contents of the specified dynamic content file (e.g., the ASP.NET page). This hierarchy is based upon both server-side control objects and user control objects referenced within the specified dynamic content file.

If any user control objects are found, operation 305 determines whether any source code files for the user control objects are new, or have been modified, since the last compilation of the user control object. If operation 305 determines that changes have occurred to the source code files, operation 306 compiles the user control object, and all user control objects referenced therein that have been modified, to create a new user control object to be used when generating the HTML representation of a web page. Otherwise, the processing continues directly to operation 307.

In operation 307, the server-side control objects of the control object hierarchy perform one or more of the following operations: Post back event handling, post back data handling, state management, and data binding. In operation 308, each server-side control object in the hierarchy is called to generate (or render) data, such as HTML code, for display of client-side user interface elements in the web page. Note that, although the term "render" may be used to describe the operation of displaying graphics on a user-interface, the term "render" is also used herein to describe the operation of generating authoring language data that can be interpreted by client-application, such as browser, for display and client-side functionality. Calls to render methods in individual control objects are performed using a tree traversal sequence. That is, a call to the render method of a page object results in recursive traversal throughout appropriate server-side control objects in the hierarchy.

Alternatively, the actual creation of the individual server-side control objects may be deferred until the server-side control object is accessed (such as when handling post back input, loading a state, rendering HTML code from the control object, etc.) in operations 307 or 308. If a server-side control object is never accessed for a given request, deferred control object creation optimizes server processing by eliminating an unnecessary object creation operation.

Operation 310 transmits the HTML code to the client in an HTTP response. In operation 314, the client receives the HTML code associated with a new web page to be displayed. In operation 316, the client system displays the user interface elements of the new page in accordance with the HTML code received from the HTTP response. In operation 312, the server-side control object hierarchy is terminated. Server-side control objects in the hierarchy are created in response to an HTTP request referencing an associated ASP+page, and destroyed subsequent to the rendering of authoring language data (e.g., HTML data). Alternatively, operation 312 may alternatively be performed after operation 308 and before operation 310.

Figure 4:
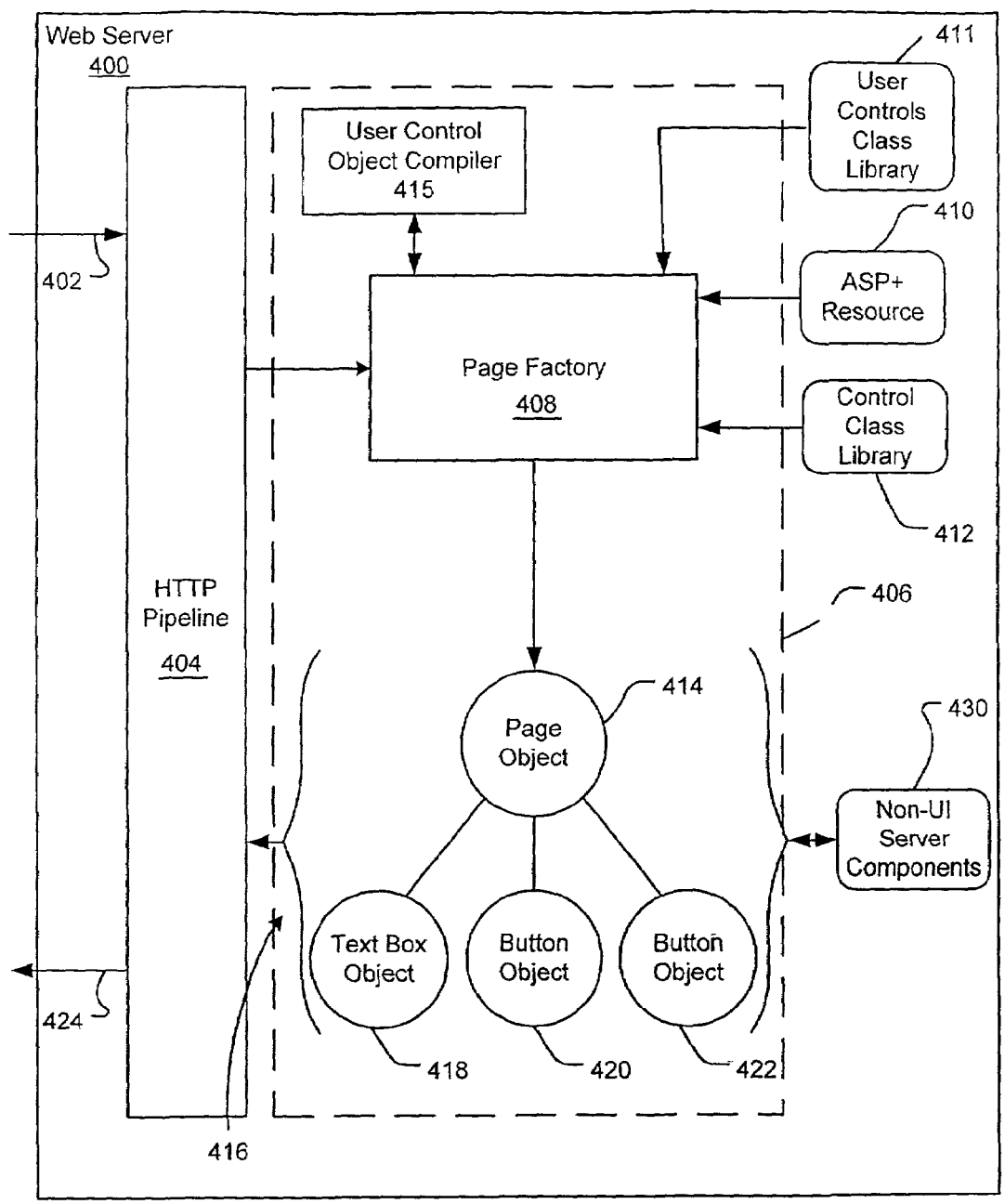
FIG. 4 illustrates exemplary modules in a web server used in an embodiment of the present invention.

FIG. 4 illustrates exemplary modules in a web server used in an embodiment of the present invention. The web server 400 receives an HTTP request 402 into the HTTP pipeline 404. The HTTP pipeline 404 may include various modules, such as modules for logging of web page statistics, user authentication, user authorization, and output caching of web pages. Each incoming HTTP request 402 received by the web server 400 is ultimately processed by a specific instance of an Interface Handler; e.g., IHttpHandler class (shown as handler 406). The handler 406 resolves the URL request after an appropriate handler factory (e.g., a page factory module 408) creates the needed handler 406.

In FIG. 4, a page factory module 408 associated with the ASP.NET page 410 is invoked to handle the instantiation and configuration of objects from the ASP.NET page 410. The ASP.NET page 410 is identified or referenced by a unique URL and may be further identified by ".aspx" suffix, although other suffixes may be used. When a request for a particular ".aspx" resource is first received by the page factory module 408, the page factory module 408 searches the file system for the appropriate resource or file (e.g., the .aspx page 410). The file may contain text (e.g., authoring language data) or another data format (e.g., byte-code data or encoded data) that may later be interpreted or accessed by the server to service the request. If the physical file exists, the page factory module 408 opens the file and reads the file into memory. Alternatively, if the requested file exists but has been previously loaded into memory, then the resource may not necessarily need to be loaded into memory, as discussed in more detail below. If the requested aspx file cannot be found, the page factory module 408 returns an appropriate "file not found" error message, e.g., by sending an HTTP "404" message back to the client.

Once the ASP.NET page 410 is read into memory, the page factory module 408 processes the file content to build a data model of the page (e.g., lists of script blocks, directives, static text regions, hierarchical server-side control objects, server-side control properties, etc.). The data model is used to generate a source code file of a new object class, such as a COM+ (Component Object Model+) class, that extends the page base class, which is the code that defines the structure, properties, and functionality of a page object. In an embodiment of the invention, the source listing is then dynamically compiled into an intermediate language, and later Just-In-Time compiled into platform native instructions (e.g., X86, Alpha, etc.). An intermediate language may include general or custom-built language code, such as COM+ IL code, Java bytecodes, Modula 3 code, SmallTalk code, and Visual Basic code. In an alternative embodiment, the intermediate language operations may be omitted, so that the native instructions are generated directly from the source listing or the source file (e.g., the ASP+ page 410). A control class library 412 may be accessed by the page factory module 408 to obtain predefined server-side control classes used in the generation of the control object hierarchy.

Similarly, user control library 411 which contains previously created and saved user controls may also be used in the generation of the control object hierarchy. As previously discussed, the user control objects are specified using .ASCX files that are processed and compiled into user control objects by a user control object compiler 415 whenever a user control object is first accessed following any modification and creation of the source code files.

The page factory module 408 creates a page object 414 from the compiled class, wherein the page object 414, which is a server-side control object that corresponds to the web page 204 shown in FIG. 2. The page object 414 and its children (i.e., a text box object 418, a button object 420, and another button object 422) comprise an exemplary control object hierarchy 416.

The page object 414 logically corresponds to the web page 204 of FIG. 2. The text box object 418 corresponds to the text box 206 in FIG. 2. Likewise, the button object 420 corresponds to the add button 208 in FIG. 2, and the button object 422 corresponds to the delete button 210 in FIG. 2. The page object 414 is hierarchically related to other control objects on the server. In one embodiment, a page object is a container object that hierarchically contains its children objects. In an alternative embodiment, other forms of hierarchical relations may be employed, including a dependency relationship. In a more complex control object hierarchy with multiple levels of children, a child object can be a container object for other child objects.

In the illustrated embodiment, the control objects in the control object hierarchy 416 are created and executed on the server 400, and server-side control object may logically corresponds to a corresponding user-interface element on the client, although server-side control objects may also correspond to non-user interface elements of an ASP.NET page as well. The server-side control objects also cooperate to handle post back input from the HTTP request 402, to manage the states of server-side control objects, to perform data binding with server-side databases, and to generate authoring language data (e.g., HTML code) used to display a resulting web page at the client. The resulting authoring language data is generated (i.e., rendered) from the server-side control object hierarchy 416 and transmitted to the client in an HTTP response 424. For example, resulting HTML (or other authoring language) code may reference ACTIVEX-type controls or other HTML constructs that yield client-side user interface elements (e.g., control buttons, text boxes, etc.) when processed by a browser.

By virtue of declarations made in the ASP.NET page 410, server-side control objects may access one or more non-user-interface server components 430 to provide interaction between the non-user-interface server component 430 and client-side user interface elements. For example, in response to post back input, server-side control objects can raise server-side events to the non-user-interface server components registered for those events. In this manner the non-user-interface server component 430 can interact with the user through user interface elements without programming the code required to display and process these elements.

FIG. 5 illustrates contents of two exemplary hierarchical dynamic content file for a user specified hub control object in an embodiment of the present invention. In the illustrated embodiment, the file 500 contains plain-text declarations in an exemplary dynamic content file format (e.g., ASP.NET). Each declaration provides instructions to the page factory module 408 that reads the file 500, creates the class, invokes the appropriate server-side control objects which ultimately render HTML code or any other authoring language for transmission to the client in an HTTP response.

The first two line of the file 500 includes a directive between delimiters "<%@" and "%>" in the format:

<%@ directive {attribute=value}%> where directive may include without limitation "page", "cache" or "import". Directives are used by the page factory module 408 when processing a dynamic content file to determine such characteristics as buffering semantics, session state requirements, error handling schemes, scripting languages, transaction semantics, and import directions. Directives may be located anywhere within a page file.

In the particular embodiment of a file 500, line 1 provides a simple textual description of the page being generated when the URL http://www.microsoft.com/testpage.aspx is referenced. The second line of the file 500 provides a reference to a user control which will be used in the file 500. The "REGISTER" directive has the following format:

<% Register TagPrefix="TagPrefixName"
    TagName="Name" src="fileIdentifier"%>

The TagPrefix and TagName are used when the user control is referenced later in the file 500. In this particular embodiment, the user control is referenced in line 11 of file 500. The fileIdentifier refers to a unique identifier for where the web server 216 may find the source file for the user control. Each user control using within a file 500 typically possesses a register declaration to permit the ASP.NET server to resolve all references to controls used in the file 500. For user controls of the same type, a single declaration may also be used.

In the third line, <html> is a standard HTML starting tag, which is written to the source code file as a literal text such that no additional processing takes place on the information in order to render the resulting HTML code other than a straightforward "write" command. In HTML, the <html> indicates the beginning of the HTML file and is paired with the closing tag on line 21, </html>, which is also a literal.

A code declaration block is located at lines 4–8 of the file 500. Generally, code declaration blocks define page objects and control object member variables and methods that are executed on the server. In the format:

```
<script runat = "server" [language = "language"][sre = "externalfile"]>
    ..................
</script>
``` where the language and src parameters are optional. In an embodiment of the present invention, code declaration blocks are defined using <script> tags that contain a "runat" attribute having a value set to "server". Optionally, a "language" attribute may be used to specify the syntax of the inner code. The default language may represent the language configuration of the overall page; however, the "language" attribute in the code declaration block allows a developer to use different languages within the same web page implementation including, for example, Jscript and PERL (Practical Extraction and Report Language). The "<script>" tag may also optionally specify a "src" file, which is an external file from which code is inserted into the dynamic content file for processing by the page compiler. It should be understood that the disclosed syntax is used in one embodiment, however, alternative embodiments may employ different syntaxes within the scope of the present invention.

In an embodiment of the present invention, a general syntax for declaring HTML control objects is as follows:

```
<HTMLTag id = "Optional Name" runat = server>
    ..................
</HTMLTag>
```

In addition to standard HTML control tags, an embodiment of the present invention enables developers to create reusable components that encapsulate common programmatic functionality outside of the standard HTML tag set. These custom server-side control objects are specified using declarative tags within a page file. Custom server-side control object declarations include a "runat" attribute with a value set to "server". Optionally, the unique "id" attribute may be specified to enable programmatic referencing of the custom control object. In addition, declarative name/value attribute pairs on a tag element specify property arguments and event bindings on a server-side control object. A format for a custom server-side control object declaration is:

```
<servercntrlclassname id="OptionalName"
    [propertyname="propval"]runat=server/>
``` where servercntrlclassname is a name of an accessible server control class, OptionalName is a unique identifier of the server-side control object, and propval represents an optional property value in the control object.

Using an alternative declaration syntax, XML declarative statements that possess an XML tag prefix and end with a character sequence "/>" may be used to provide a more concise notation for specifying server-side control objects within a page, using the following format:

```
<tagprefix:classname
    id="OptionalName"runat=server/>
``` where tagprefix is associated with a given control namespace library and classname represents a name of a control in the associated name-space library. An optional property-value is also supported.

With respect to the particular embodiment in file 500, line 4 declares the particular programming language that is to be used within the following programming script to follow. While in this embodiment, Visual Basic is disclosed, any programming language, including C, FORTRAN, Pascal, Perl, COBOL, Lisp, and any other programming language desired by a developer may be used within the spirit and scope of the present invention as recited in the attached claims. As long as the web server 216 has a corresponding compiler to process the source code contained therein, any programming language may be used.

This fact allows developers to create various user controls in different languages while easily permitting the resulting programming objects to interact. A developer may use one language to develop one particular user control in a first programming language best suited for its functionality, for example, string manipulation, and a second user control in a different programming language when significant numeric computations are to be performed. A developer may optimize the use of a programming language for the task to be performed within a single web server.

The user control is used in line 11 of file 500 with the following format:

```
<merchant:datagrid id=MySimpleControl
    runat=server/>
```

The reference to "merchant" and "datagrid" above together refer to the user control "MySimpleControl" registered in line 2 as discussed above and exposed within "merchant" that is being manipulated within file 500. The "id="mySimpleControl" reference permits the script code to programmatically reference the user control and all publicly exposed properties as a programming object as shown in line 6 of file 500. The runat=server indicates that this control is to be performed on the server.

As stated above, the "merchant" user control is specified within a file having a unique identifier "MySimpleControl.ascx." This identifier corresponds to a unique filename on the server or a URL on the web that allows the web server 216 to locate the specification for the user control. Of course, any other types of unique identification systems would work as long as they allow the web server to resolve the location of the control when processing the aspx page.

The user control file 510 within MySimpleControl.ascx uses a similar format as other aspx files that allow for use of a programming language within a script block and HTML within the file itself. In this example embodiment, the user control does not use other user controls. If it did, the user control would recite one or more "register" declarations as discussed above. The script block for this example embodiment contains a simple database server call in line 5 of file 510 to obtain a set of data defined by a query "Select * from Authors=" & CustomerState. The CustomerState property refers to the publicly exposed string identified in line 3 of file 510. The declaration that the property is public allowed the subsequent page that uses the control to reference it as is shown in line 6 of file 500. Additionally, the property can be referenced directly in a use of the control as follows:

```
<merchant:datagrid CustomerState="MA"
    runat=server/>
```

In this case the public string CustomerState is set to MA for use in the query rather than the CA shown in file 500. The user control in file 510 uses a system control identified as ASP:datagrid. The reference to ASP identifies the control as a system provided control. The datagrid is the particular control name. The datagrid generates a grid to create a table to hold the data returned from the database query.

Because these controls may be used with multiple instances of itself as well as other controls created by potentially other developers who used any number of programming languages, each control of any type (ie. System provided controls, third-party compiled controls, or user controls) operates within its own separate namespace and is isolated from the operation of all other controls. These properties allow the controls to use the programming language of choice. The mechanism which permits the controls to communicate between each other is the use of public properties which may be as few or as many as desired.

Figure 6:
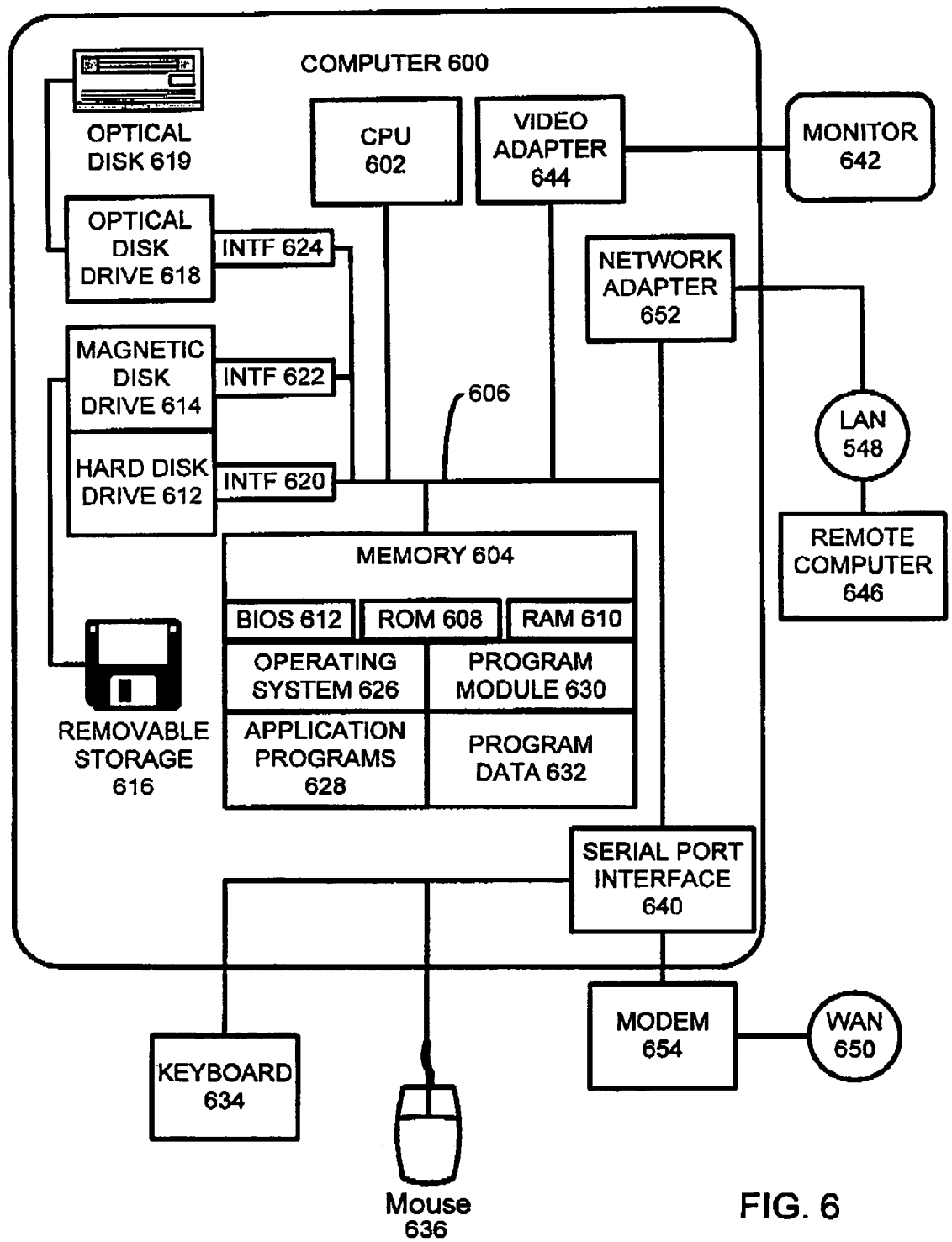
FIG. 6 illustrates an exemplary system useful for implementing an embodiment of the present invention.

With reference to FIG. 6, an exemplary computing system for embodiments of the invention includes a general purpose computing device in the form of a conventional computer system 600, including a processor unit 602, a system memory 604, and a system bus 606 that couples various system components including the system memory 604 to the processor unit 602. The system bus 606 may be any of several types of bus structures including a memory bus or memory controller, a peripheral bus and a local bus using any of a variety of bus architectures. The system memory includes read only memory (ROM) 608 and random access memory (RAM) 610. A basic input/output system 612 (BIOS), which contains basic routines that help transfer information between elements within the computer system 600, is stored in ROM 608.

The computer system 600 further includes a hard disk drive 612 for reading from and writing to a hard disk, a magnetic disk drive 614 for reading from or writing to a removable magnetic disk 616, and an optical disk drive 618 for reading from or writing to a removable optical disk 619 such as a CD ROM, DVD, or other optical media. The hard disk drive 612, magnetic disk drive 614, and optical disk drive 618 are connected to the system bus 606 by a hard disk drive interface 620, a magnetic disk drive interface 622, and an optical drive interface 624, respectively. The drives and their associated computer-readable media provide nonvolatile storage of computer readable instructions, data structures, programs, and other data for the computer system 600.

Although the exemplary environment described herein employs a hard disk, a removable magnetic disk 616, and a removable optical disk 619, other types of computer-readable media capable of storing data can be used in the exemplary system. Examples of these other types of computer-readable mediums that can be used in the exemplary operating environment include magnetic cassettes, flash memory cards, digital video disks, Bernoulli cartridges, random access memories (RAMs), and read only memories (ROMs).

A number of program modules may be stored on the hard disk, magnetic disk 616, optical disk 619, ROM 608 or RAM 610, including an operating system 626, one or more application programs 628, other program modules 630, and program data 632. A user may enter commands and information into the computer system 600 through input devices such as a keyboard 634 and mouse 636 or other pointing device. Examples of other input devices may include a microphone, joystick, game pad, satellite dish, and scanner. These and other input devices are often connected to the processing unit 602 through a serial port interface 640 that is coupled to the system bus 606. Nevertheless, these input devices also may be connected by other interfaces, such as a parallel port, game port, or a universal serial bus (USB). A monitor 642 or other type of display device is also connected to the system bus 606 via an interface, such as a video adapter 644. In addition to the monitor 642, computer systems typically include other peripheral output devices (not shown), such as speakers and printers.

The computer system 600 may operate in a networked environment using logical connections to one or more remote computers, such as a remote computer 646. The remote computer 646 may be a computer system, a server, a router, a network PC, a peer device or other common network node, and typically includes many or all of the elements described above relative to the computer system 600. The network connections include a local area network (LAN) 548 and a wide area network (WAN) 650. Such networking environments are commonplace in offices, enterprise-wide computer networks, intranets, and the Internet.

When used in a LAN networking environment, the computer system 600 is connected to the local network 548 through a network interface or adapter 652. When used in a WAN networking environment, the computer system 600 typically includes a modem 654 or other means for establishing communications over the wide area network 650, such as the Internet. The modem 654, which may be internal or external, is connected to the system bus 606 via the serial port interface 640. In a networked environment, program modules depicted relative to the computer system 600, or portions thereof, may be stored in the remote memory storage device. It will be appreciated that the network connections shown are exemplary, and other means of establishing a communication link between the computers may be used.

In an embodiment of the present invention, the computer 600 represents a web server, wherein the CPU 502 executes a page factory module 408 on an ASP+ file stored on at least one of storage media 616, 612, 614, 618, 619, or memory 504. HTTP responses and requests are communicated over the LAN 548 which is coupled to a client computer 646.

The embodiments of the invention described herein are implemented as logical steps in one or more computer systems. The logical operations of the present invention are implemented (1) as a sequence of processor-implemented steps executing in one or more computer systems and (2) as interconnected machine modules within one or more computer systems. The implementation is a matter of choice, dependent on the performance requirements of the computer system implementing the invention. Accordingly, the logical operations making up the embodiments of the invention described herein are referred to variously as operations, steps, objects, or modules.

Figure 7:
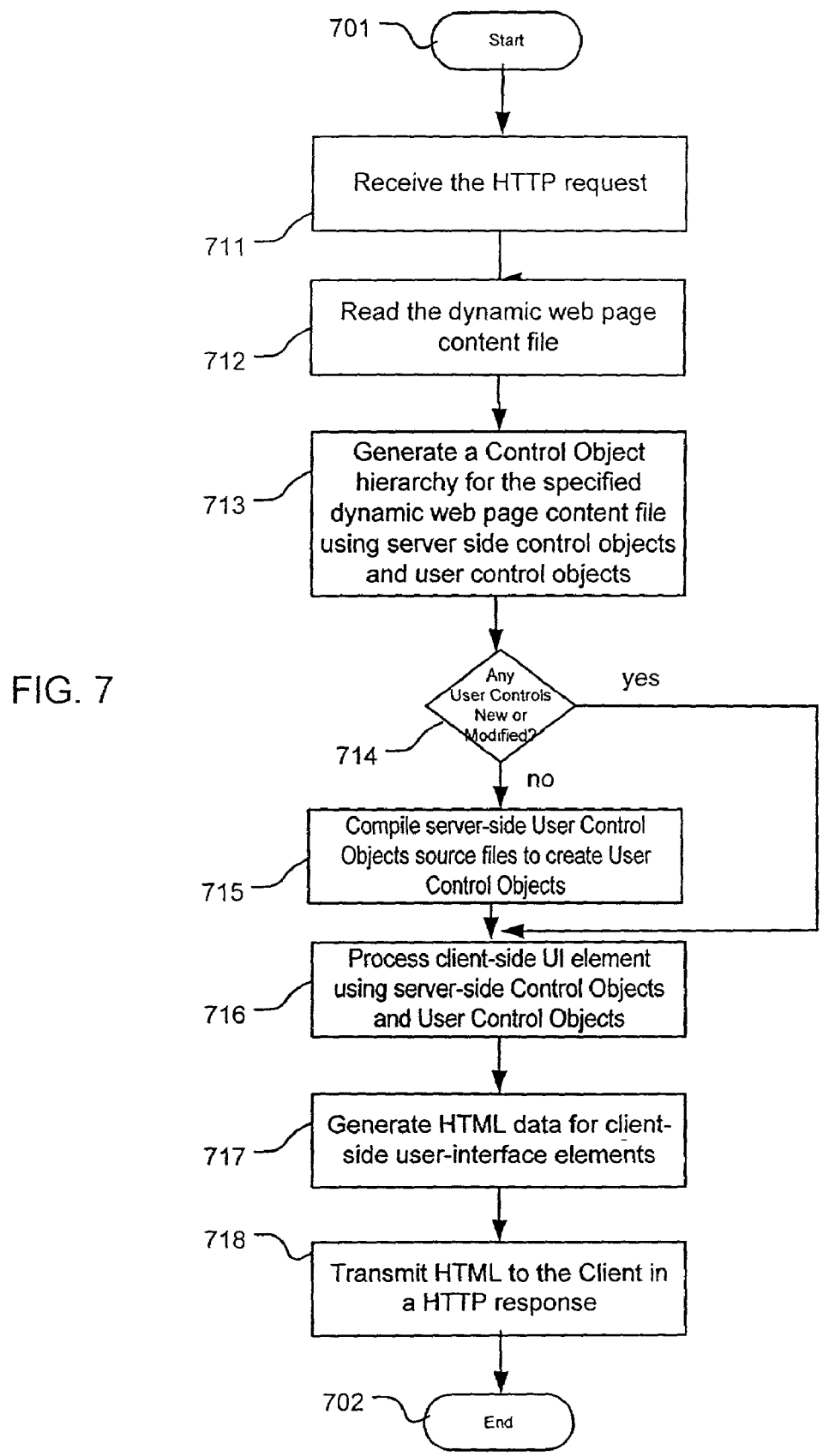
FIG. 7 illustrates a process flow diagram representing processing of a page object in an embodiment of the present invention.

FIG. 7 illustrates a process flow diagram representing processing of a page object in an embodiment of the present invention. The processing begins 701 when a client transmits an HTTP request to the server. The HTTP request includes a URL that specifies a resource, such as an ASP-.NET page. In operation 711, the server receives the HTTP request and invokes the appropriate handler for processing the specified resource. The dynamic page specification file is read in operation 712. Operation 713 generates a server-side control object hierarchy based on the contents of the specified dynamic content file (e.g., the ASP.NET page). This hierarchy is based upon both server-side control objects and user control objects referenced within the specified dynamic content file.

If any user control objects are found, operation 714 determines whether any source code files for the user control objects are new, or have been modified, since the last compilation of the user control object. If operation 714 determines that changes have occurred to the source code files, operation 715 compiles the user control object, and all user control objects referenced therein that have been modified, to create a new user control object to be used when generating the HTML representation of a web page. Otherwise, the processing continues directly to operation 716.

In operation 716, the server-side control objects of the control object hierarchy perform one or more of the following operations: Post back event handling, post back data handling, state management, and data binding. In operation 717, each server-side control object in the hierarchy is called to generate (or render) data, such as HTML code, for display of client-side user interface elements in the web page. Note that, although the term "render" may be used to describe the operation of displaying graphics on a user-interface, the term "render" is also used herein to describe the operation of generating authoring language data that can be interpreted by client-application, such as browser, for display and client-side functionality. Calls to render methods in individual control objects are performed using a tree traversal sequence. That is, a call to the render method of a page object results in recursive traversal throughout appropriate server-side control objects in the hierarchy. Operation 718 transmits the HTML code to the client in an HTTP response and the processing then ends 702.

The above specification, examples and data provide a complete description of the manufacture and use of the composition of the invention. Since many embodiments of the invention can be made without departing from the spirit and scope of the invention, the invention resides in the claims hereinafter appended. The invention may also be described in the general context of computer-executable instructions, such as program modules, executed by one or more computers or other devices. Generally, program modules include routines, programs, objects, components, data structures, etc. that perform particular tasks or implement particular abstract data types. Typically the functionality of the program modules may be combined or distributed in desired in various embodiments.

In particular, a web server 102 typically includes at least some form of computer readable media. Computer readable media can be any available media that can be accessed by network server 102. By way of example, and not limitation, computer readable media may comprise computer storage media and communication media.

Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, BC-ROM, digital versatile disks (DVD) or other optical storage, magnetic cassettes, magnetic tape, magnetic disk storage or other magnetic storage devices, or any other medium which can be used to store the desired information and which can be accessed by web server 102.

Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

What is claimed is:

1. In a server computer system having memory, a method of creating a class in memory, wherein the class is used by the server computer system to create server-side objects for dynamically rendering web page content, the web page content delivered to a client-side computer system and displayed as a web page on the client computer system, said method comprising:
   receiving a request from the client specifying a dynamic web page content file;
   processing the dynamic web page content file to produce a source code file containing source code that represent control objects declared in the web page content file; and
   compiling the source code file to produce a class from which a set of hierarchical objects can be instantiated to produce web page authoring language that produces a web page for display;
   wherein the source code file declaratorily refers to one or more additional dynamic web page content files, each reference to the one or more additional dynamic web page content files correspond to a single hierarchical object within the set of hierarchical objects.

2. The method according to claim 1, wherein the source code file may be referenced by a second source code file as one of the one or more additional dynamic web page content files.

3. The method as defined in claim 2, wherein the dynamic web page content file is a server-side declaration datastore.

4. The method as defined in claim 2, wherein the class is stored in cache memory on the server computer system and is available to instantiate objects in response to another request specifying the dynamic web page content file.

5. The method as defined in claim 2, wherein the class is stored on a magnetic storage medium and is available to instantiate objects in response to another request specifying the dynamic web page content file.

6. The method as defined in claim 2, wherein the step processing the dynamic web page content file comprises:
   parsing the dynamic web page content file to store portions of the file into a data model, the data model comprises a plurality of data objects linked in a hierarchical manner;
   generating source code related to declaration information based on an analysis of the data model during a first phase;
   writing the source code related to declaration information to the source code file;
   generating source code related to control object information based on an analysis of the data model during a second phase; and
   writing the source code related to control object information to the source code file during the second phase;
   where the one or more of the plurality of data objects correspond to compiled versions of one or more additional dynamic web page content file.

7. A method as defined in claim 6, wherein the method further comprises:
   generating source code related to rendering information based on an analysis of the data model during a third phase; and
   writing the source code related to rendering information to the source code file during the third phase.

8. The method as defined in claim 2, further comprising the following:
   prior to the step of processing the dynamic web page content file, determining whether the class related to the received request has been compiled and stored in memory; and
   if the class has been compiled and stored in memory, skipping the processing step, otherwise continue with the processing step.

9. A computing system having memory and encoding a computer program for executing a computer process creating a class in memory, wherein the class is used by the server computer system to create server-side objects for dynamically rendering web page content, the web page content delivered to a client-side computer system and displayed as a web page on the client computer system, said computer process comprising:
   receiving a request from the client specifying a dynamic web page content file;
   processing the dynamic web page content file to produce a source code file containing source code that represent control objects declared in the web page content file; and
   compiling the source code file to produce a class from which a set of hierarchical objects can be instantiated to produce web page authoring language that produces a web page for display;
   wherein dynamic web page content file declaratorily refers to one or more additional dynamic web page content files, each reference to the one or more additional web page content files correspond to a single hierarchical object within the set of hierarchical objects.

10. A computer program storage medium readable by a computer system having memory and encoding a computer program for executing a computer process creating a class in memory, wherein the class is used by the server computer system to create server-side objects for dynamically rendering web page content, the web page content delivered to a client-side computer system and displayed as a web page on the client computer system, said computer process comprising:
  receiving a request from the client specifying a dynamic web page content file;
  processing the dynamic web page content file to produce a source code file containing source code that represent control objects declared in the web page content file; and
  compiling the source code file to produce a class from which a set of hierarchical objects can be instantiated to produce web page authoring language that produces a web page for display;
  wherein dynamic web page content file declaratorily refers to one or more additional dynamic web page content files, each reference to the one or more additional web page content files correspond to a single hierarchical object within the set of hierarchical objects.

11. In a server computer system having memory, a method of creating a plurality of web page responses having dynamically rendered web page content, the web page responses delivered to one or more client-side computer systems and displayed as a web pages on the client computer systems, said method comprising:
  receiving a request from the client computer system for the web page, wherein the request identifies a dynamic web page content file;
  creating a hierarchical data model containing one or more control objects to store elements of the dynamic web page content file;
  generating a source code file related to the dynamic web page content file based on the evaluation of the data model;
  compiling the source code file to create a compiled class in memory;
  returning a class reference to the server computer system enabling the server computer system to instantiate server-side processing objects from that class to dynamically generate web page content;
  rendering the dynamic web page content into a web page response for delivery to the client computer system;
  conducting the web page response to the requesting client computer system;
  receiving a second request for the web page, wherein the request identifies a dynamic web page content file;
  determining that a compiled class for that dynamic web page content file resides in memory;
  returning a class reference to the server computer system enabling the server computer system to instantiate server-side processing objects from that class to dynamically generate web page content;
  rendering the dynamic web page content into a second web page response; and
  conducting the second web page response to the requesting client computer system;
  wherein the dynamic web page content file declaratorily refers to one or more additional dynamic web page content files, each reference to the one or more additional dynamic web page content files correspond to a single hierarchical object within the set of hierarchical objects.

12. A computer program storage medium readable by a computer system having memory and encoding a computer program for executing a computer process creating a plurality of web page responses having dynamically rendered web page content, the web page responses delivered to one or more client-side computer systems and displayed as a web pages on the client computer systems, said computer process comprising:
  receiving a request from the client computer system for the web page, wherein the request identifies a dynamic web page content file;
  creating a hierarchical data model containing one or more control objects to store elements of the dynamic web page content file;
  generating a source code file related to the dynamic web page content file based on the evaluation of the data model;
  compiling the source code file to create a compiled class in memory;
  returning a class reference to the server computer system enabling the server computer system to instantiate server-side processing objects from that class to dynamically generate web page content;
  rendering the dynamic web page content into a web page response for delivery to the client computer system;
  conducting the web page response to the requesting client computer system;
  receiving a second request for the web page, wherein the request identifies a dynamic web page content file;
  determining that a compiled class for that dynamic web page content file resides in memory;
  returning a class reference to the server computer system enabling the server computer system to instantiate server-side processing objects from that class to dynamically generate web page content;
  rendering the dynamic web page content into a second web page response; and
  conducting the second web page response to the requesting client computer system;
  wherein the dynamic web page content file declaratorily refers to one or more additional dynamic web page content files, each reference to the one or more additional dynamic web page content files correspond to a single hierarchical object within the set of hierarchical objects.

13. A computing system having memory and encoding a computer program for executing a computer process creating a plurality of web page responses having dynamically rendered web page content, the web page responses delivered to one or more client-side computer systems and displayed as a web pages on the client computer systems, said computer process comprising:
  receiving a request from the client computer system for the web page, wherein the request identifies a dynamic web page content file;
  creating a hierarchical data model containing one or more control objects to store elements of the dynamic web page content file;
  generating a source code file related to the dynamic web page content file based on the evaluation of the data model;
  compiling the source code file to create a compiled class in memory;
  returning a class reference to the server computer system enabling the server computer system to instantiate server-side processing objects from that class to dynamically generate web page content;
  rendering the dynamic web page content into a web page response for delivery to the client computer system;

conducting the web page response to the requesting client computer system;

receiving a second request for the web page, wherein the request identifies a dynamic web page content file;

determining that a compiled class for that dynamic web page content file resides in memory;

returning a class reference to the server computer system enabling the server computer system to instantiate server-side processing objects from that class to dynamically generate web page content;

rendering the dynamic web page content into a second web page response; and conducting the second web page response to the requesting client computer system;

wherein the dynamic web page content file declaratorily refers to one or more additional dynamic web page content files, each reference to the one or more additional dynamic web page content files correspond to a single hierarchical object within the set of hierarchical objects.

14. A computer program product encoding a computer program for executing in a computer system a computer process for creating a class in memory, wherein the class is used by a server computer system to create server-side objects for dynamically rendering authoring language elements, the elements are delivered to a client-side computer system and processed on the client computer system, said process comprising:

receiving a request from the client computer system for the resource, wherein the request identifies a dynamic web page resource;

processing the resource to generate a source code file related to the resource; and compiling the source code file to create a compiled class in memory to enable the instantiation of hierarchical objects of the compiled class;

wherein the source code file declaratorily refers to one or more dynamic web page content files, each reference to the one or more dynamic web page content files correspond to a single hierarchical object within the hierarchical objects.

15. A computer program product encoding a computer program for executing in a computer system a computer process for creating a class in memory as defined in claim 14, wherein the processing step of creating a data model comprises:

parsing the resource to separate the resource into logical elements and identify relationships between the logical elements;

creating a plurality of hierarchically related data structures forming a hierarchical data model; and storing portions of the resource in the data structures.

16. A computer program product encoding a computer program for executing in a computer system a computer process for creating a class in memory as defined in claim 15, wherein the processing step of generating source code comprises further comprises the step of generating an intermediate data structure, wherein the source code is generated from the intermediate data structure.

17. A computer program product encoding a computer program for executing in a computer system a computer process for creating a class in memory as defined in claim 16, wherein the processing step of generating an intermediate data structure further comprises:

performing a first analysis of the resource to generate intermediate data structure elements related to variable declaration information;

performing a second analysis of the resource to generate intermediate data structure elements related to control object information;

performing a third analysis of the resource to generate intermediate data structure elements related to rendering information; and generating source code from the intermediate data structure.

18. A computer program product encoding a computer program for executing in a computer system a computer process for creating a class in memory as defined in claim 17, wherein the intermediate data structure is a generic description that may be translated into a plurality of source code language files, wherein at least one source code file is different from another source code language file.

19. A computer program product encoding a computer program for executing in a computer system a computer process for creating a class in memory as defined in claim 14, wherein the processing step comprises the following steps:

performing a first analysis of the resource to generate source code related to variable declaration information;

performing a second analysis of the resource to generate source code related to control object information;

performing a third analysis of the resource to generate source code related to rendering information; and storing the source code in the source code file.

* * * * *